United States Patent

Hanisko

[11] Patent Number: 5,999,093
[45] Date of Patent: Dec. 7, 1999

[54] SINGLE LAMP BRAKE STATUS INDICATOR SYSTEM

[76] Inventor: John-Cyril P. Hanisko, 21888 Murray Crescent, Southfield, Mich. 48076

[21] Appl. No.: 08/863,705

[22] Filed: May 27, 1997

[51] Int. Cl.$^6$ ..................................................... B60Q 1/00
[52] U.S. Cl. ......................... 340/454; 340/453; 188/1.11
[58] Field of Search ................................. 340/454, 453; 188/1.11

[56] References Cited

U.S. PATENT DOCUMENTS

| | | |
|---|---|---|
| 2,117,027 | 5/1938 | Langbein . |
| 3,456,236 | 7/1969 | Labartino et al. . |
| 3,556,258 | 1/1971 | Winge et al. ........................ 188/1.11 |
| 3,594,721 | 7/1971 | Frenkel et al. . |
| 3,675,197 | 7/1972 | Bennett et l. ........................ 340/454 |
| 3,713,091 | 1/1973 | Kobayashi et al. ................... 340/454 |
| 3,716,831 | 2/1973 | Rikard et al. . |
| 3,735,343 | 5/1973 | Lane et al. . |
| 3,755,774 | 8/1973 | Wilhelm . |
| 3,825,891 | 7/1974 | Kinast . |
| 3,869,695 | 3/1975 | Kita . |
| 3,882,448 | 5/1975 | Shibatni et al. ........................ 340/454 |
| 3,902,157 | 8/1975 | Kita et al. . |
| 3,902,158 | 8/1975 | Dahlkvist . |
| 4,004,269 | 1/1977 | Arai et al. ............................. 340/454 |
| 4,020,454 | 4/1977 | Malonee . |
| 4,204,190 | 5/1980 | Wiley et al. . |
| 4,298,857 | 11/1981 | Robins et al. . |
| 4,508,196 | 4/1985 | Jamon . |
| 4,562,421 | 12/1985 | Duffy . |
| 5,253,735 | 10/1993 | Larson et al. . |
| 5,302,940 | 4/1994 | Chen . |
| 5,358,075 | 10/1994 | Jarzombek . |

*Primary Examiner*—Edward Lefkowitz
*Attorney, Agent, or Firm*—Longacre & White

[57] ABSTRACT

An electronic circuit connected in series with one or more brake condition sensors having a first transistor and a second transistor connected to intermittently power an indicator lamp upon initial power-up to confirm circuit operational status and subsequently to activate the indicator lamp if the brake condition sensors are acceptable and to deactivate the indicator lamp if any one of the brake condition sensors is unacceptable.

10 Claims, 1 Drawing Sheet

SINGLE LAMP BRAKE STATUS INDICATOR SYSTEM

BACKGROUND OF THE INVENTION

1. Field of the Invention

The present invention relates to an electronic circuit for indication of the operational status of a vehicle brake system. More specifically, the present invention relates to an electronic circuit for indication of the operational status of a vehicle brake system where an indicator lamp first is transiently activated to indicate circuit functionality and is then deactivated and remains deactivated once a brake fault has occurred.

2. Description of the Prior Art

Prior art brake wear and adjustment systems connect each sensor to a condition electronics module to generate a signal to the driver or mechanic that brake service is required. Many systems have been developed in the past to provide a signal to a vehicle operator to warn that brake lining wear or actuator travel has progressed a predetermined amount. However, these systems have been generally unsatisfactory due to their complexity and/or unreliability.

Examples of these prior art systems can be found in U.S. Pat. Nos. 3,594,721; 3,716,831; 3,735,343; 3,755,774; 3,869,695 and 3,902,157 the disclosures of which are hereby incorporated by reference, which disclose electronic signaling systems for the detection and notification of abnormal brake wear. One disadvantage with many of these systems is the parallel wiring configuration which results in a large number of conductors that must be used to connect the sensors with the electronic monitoring unit. Another disadvantage is that some prior art systems do not indicate when brake, service is required if a short to ground fault occurs in the detection circuit.

U.S. Pat. No. 3,456,236 discloses a brake shoe wear indicator system where the wear sensors are connected in series to a relay which, when deenergized, closes contacts to light a bulb in a trouble alarm circuit. This concept lacks the reliability required of a brake condition alarm system because it indicates a working brake system when the light is burned out or there exists an open circuit to the bulb. Another problem with many of the prior art brake wear systems is that an electrical current is carried through the wheel bearings which can cause premature failure of the bearing(s). A system that eliminates or reduces electrical current that must be carried through a bearing would be desirable.

SUMMARY OF THE INVENTION

The present invention provides an electronic circuit for controlling an indicator lamp thereby signaling to the operator whether or not brake service is required. The opening of a plurality of brake sensors which can include either a brake actuator limit switch and/or a brake shoe wear sensor prevents an indicator lamp (LED) from becoming energized and causes it to remain deenergized irrespective of the activation or deactivation of the brake system. Using the circuit of the present invention, a series connection between the wear sensor and the travel switch can be used and the current through the wheel bearing can be eliminated even if the wear sensor is shorted to ground through the brake drum.

One provision of the present invention is to provide a brake wear electronic circuit for indication to the operator when brake service is not required.

Another provision of the present invention is to provide a brake wear electronic circuit for deactivating an indicator lamp when brake service is required.

Another provision of the present invention is to eliminate electrical current through the wheel bearing when the wear sensor is grounded to the brake drum.

Another provision of the present invention is to provide a brake condition circuit which deactivates an indicator lamp when a brake activator travel limit switch opens or when a brake shoe wear sensor opens.

Another provision of the present invention is to provide a brake condition circuit that can be packaged with an indicator lamp.

Another provision of the present invention is that when the system is first powered up, the indicator lamp will blink as an indication that the system is operational.

Still another provision of the present invention is to provide a brake condition circuit which deactivates an indicator lamp when brake service is required where the indicator lamp remains deactivated as long as electrical power is available.

DETAILED DESCRIPTION OF THE PREFERRED EMBODIMENT

Figure 1:
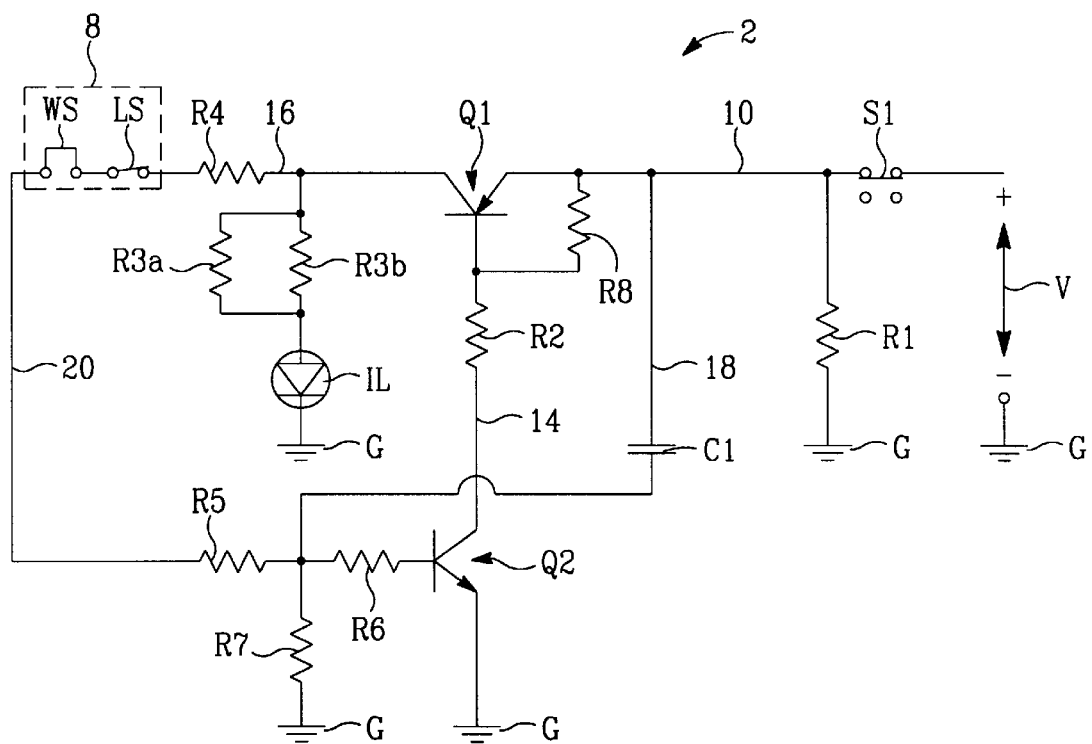
FIG. 1 is an electrical schematic diagram of the brake condition circuit of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Now referring to FIG. 1, an electrical schematic of the brake condition circuit 2 of the present invention is shown. The brake shoe wear sensor WS and the brake actuator travel limit switch LS which combine to make up the brake sensor system 8 are both mounted to the brake assembly of a truck. The brake sensor system 8 can include a plurality of brake condition sensors which, preferably, are normally closed and electrically connected in series. As long as the travel of the actuator rod is within its normal operating range, the limit switch LS remains closed. The limit switch LS opens when the actuator rod travel exceeds a preselected travel limit but again closes when the actuator rod position returns to normal. The present invention provides a visual display in the form of an indicator lamp IL which is preferably one or more light emitting diodes (LEDs) but can be an incandescent light that remains activated until the limit switch LS has opened. Any other type of indication system could replace the indicator lamp IL such as another electronic circuit that would provide additional processing and/or signal the operator using other means. The indicator lamp IL first blinks upon application of power, deactivates if LS opens, and then remains deactivated as long as electrical power is supplied to the brake condition circuit 2 even if the travel limit switch LS again closes.

The brake shoe wear sensor WS connected in series with the limit switch LS remains closed as long as there is sufficient brake shoe material remaining. Once the brake shoe wears to a preselected thickness, the wear sensor WS opens and remains open until service is performed. An open wear sensor WS causes the indicator lamp IL to first blink, upon application of power, and then become deactivated thereby signaling the operator that brake service is required. Using the brake condition circuit 2 of the present invention, the indicator lamp IL remains deactivated even if the wear sensor WS later closes or is grounded through the brake drum (not shown).

When electrical power V which can be supplied from the brake light circuit, is first supplied to line 10 through reset switch S1, the transistor Q2, which is an NPN type of transistor, and is turned on in a transient manner, regardless of the states of LS and WS, by current flowing to its base through capacitor C1 and through resistor R6 with resistor R7 tied to electrical ground G to provide a voltage drop. Transistor Q2 turns on for a time interval determined by the value for capacitor C1 and resistors R6 and R7. This results in transistor Q1, which is a PNP type of transistor, being turned on in a transient manner causing indicator lamp IL to blink on and off thereby indicating that the brake condition circuit 2 is functional. The indicator lamp IL can be one or more LEDs connected in series or an incandescent lamp or any other suitable warning indicator. If neither the travel limit switch LS nor the wear sensor WS is open and if the wear sensor WS is not shorted to electrical ground, then the power to the base of transistor Q1 will be continuous through the path of resistor R4, limit switch LS, wear sensor LS, resistor R5 and resistor R6 and, in turn, transistor Q2 will then provide the continued base drive power to transistor Q1. Indicator lamp IL will then remain activated, thereby indicating an acceptable condition for the wear sensor WS and the travel limit switch LS.

If either the wear sensor WS or the travel limit switch LS are opened, or if the wear sensor WS is shorted to electrical ground, then transistors Q1 and Q2 will go to an off state thereby removing a voltage potential from resistor R4, limit switch LS, wear sensor WS and resistors R5 and R6 causing the indicator lamp IL to be deactivated. The unlit condition of indicator lamp IL signals that brake system service is required. Resistors R1,R2,R3A,R3B,R4 and R5 are selected to yield appropriate voltage drops. Resistors R6 and R7 are selected to yield the desired time constant when considered in conjunction with capacitor C1.

If electrical power V is supplied continuously to the circuit, the reset switch S1 is required to restart the system at which time the indicator lamp IL will blink to indicate a functional circuit and then remain energized providing the limit switch LS and wear sensor WS are closed. Otherwise, the circuit will automatically reset and recycle when power V is restored on each power down and startup.

The brake condition circuit 2 of the present invention eliminates the condition that electrical current flows through the wheel bearing(s). This feature is important to bearing suppliers in order to maximize the operational life of the bearing.

Following is a table listing the component values for the preferred embodiment of the electronic warning system 2 of the present invention.

| COMPONENT VALUES | | |
|---|---|---|
| R1 | | 10K |
| R2 | | 4.7K |
| R3A | Resistor | 634Ω 1% 3/4 w |
| R3B | Resistor | 634Ω 1% 3/4 w |
| R4 | Resistor | 10K |
| R5 | Resistor | 10K |

-continued

| COMPONENT VALUES | | |
|---|---|---|
| R6 | Resistor | 10K |
| R7 | Resistor | 10K |
| R8 | Resistor | 10K |
| C1 | Capacitor | 0.1 µf 100 v |
| IL | 3 LEDs in series | E166 |
| Q1 | PNP | MMBT540ILT1 |
| Q2 | NPN | MMBT555ILT1 |

Although this present invention has been described in its preferred form within a certain degree of particularity, it is understood that the present disclosure of the preferred embodiment has been made only by way of example, and that numerous changes in the detail construction in combination and arrangement of the elements may be resorted to without parting from the spirit and the scope of the invention as hereinafter claimed.

I claim:

1. An electronic circuit connected in series with a brake sensor system having a wear sensor and travel limit switch electrically connected in series, said circuit comprising:

a first transistor having a collector connected to said sensor system, and an emitter connected to a source of electrical power and a base;

a second transistor having a base connected to said sensor system and to said emitter of said first transistor through a capacitor and having an emitter connected to an electrical ground and having a collector connected to said base of said first transistor;

an indicator lamp connected to said sensor system and to said collector of said first transistor where said indicator lamp automatically first blinks to indicate said brake sensor system is operational when said electronic circuit is first connected to said source of electrical power and then automatically is continuously energized to indicate an acceptable condition for each of said wear sensor and said travel limit switch when said wear sensor and said travel limit switch are closed and where said indicator lamp automatically first blinks to indicate said brake sensor system is operational and then is automatically continuously deenergized to indicate brake service is required when one of said wear sensor and said travel limit switch has been opened.

2. The electronic circuit of claim 1, wherein said first transistor is a PNP type of transistor and said second transistor is an NPN type of transistor.

3. The electronic circuit of claim 1, wherein said wear sensor is comprised of a section of electrical conductor that is severed when said brake pad wears to a predetermined service limit thickness.

4. The electronic circuit of claim 1, wherein said travel limit switch is attached to a brake actuator housing and electrically opens when said actuator exceeds its travel service limit.

5. The electronic circuit of claim 1, wherein said brake sensor system comprises a plurality of brake sensors electrically connected in series.

6. The electronic circuit of claim 5, wherein said plurality of brake sensors comprises a brake pad wear sensor and a brake actuator travel limit switch.

7. A brake condition circuit for a brake assembly having a brake pad for frictional contact with a braking surface and an actuator for movement of said brake pad into contact with said condition braking surface comprising:

a brake sensor comprised of a wear sensing means for electrically opening a circuit when the brake pad wears to a predetermined service limit thickness and a switching means for opening a circuit when the brake actuator moves to a predetermined travel service limit, where said wear sensing means is connected in series with said switching means;

circuit means for automatically causing an indicator lamp electrically connected to said circuit to blink when electrical power is first supplied and thereafter continuously energizing said indicator lamp when said switching means is electrically closed and when said wear sensing means is electrically closed, and continuously deenergizing said indicator lamp when said switching means is electrically open and when said wear sensing means is electrically open.

8. The brake condition circuit of claim 7, wherein said circuit means causes said indicator lamp to blink when said switching means or said wear sensing means change state from electrically closed to open.

9. The brake condition circuit of claim 7, wherein said circuit means comprises a first transistor having a collector connected to said indicator lamp and to said wear sensor and said switching means, and having an emitter connected to a source of electrical power and a second transistor having a collector connected to a base of said first transistor and having a base connected through a capacitor to the emitter of said first transistor and connected to said brake condition sensor, and having an emitter connected to electrical ground.

10. An electronic circuit connected in series with a brake sensor system including a brake pad wear sensor and a brake actuator travel limit switch connected in series comprising:

a first PNP type transistor having a first collector connected to said sensor system, and a first emitter connected to a source of electrical power and a first base;

a second NPN type transistor having a second base connected to said sensor system and to said first emitter of said first transistor through a capacitor, said second NPN type transistor having a second emitter connected to an electrical ground and having a second collector connected to said first base of said first transistor;

an indicator means for automatically indicating an operational status of said electronic circuit and a condition of said brake sensor system, said indicator means being connected to said sensor system and to said first collector of said first transistor, wherein said indicator means automatically first indicates said operational status of said electronic circuit when supplied with a source of electrical power and automatically thereafter indicates said condition of said brake sensor.

* * * * *